United States Patent [19]

Jackson, Sr.

[11] 4,083,186
[45] Apr. 11, 1978

[54] APPARATUS AND METHOD FOR CONVERTING HYDROSTATIC ENERGY TO ELECTRICAL ENERGY

[76] Inventor: Andrew W. Jackson, Sr., P.O. Box 646, Gadsden, Ala. 35901

[21] Appl. No.: 753,573

[22] Filed: Dec. 22, 1976

[51] Int. Cl.² ............................................. F16D 31/02
[52] U.S. Cl. ...................................... 60/325; 60/327; 60/486; 60/495; 60/503; 417/339
[58] Field of Search ................. 60/325, 327, 398, 486, 60/495, 501, 502, 503, 505; 185/4, 30; 290/53, 54; 417/329, 330, 331, 334, 338, 339

[56] References Cited

U.S. PATENT DOCUMENTS

| | | | |
|---|---|---|---|
| 1,451,580 | 4/1923 | Lindenberg | 60/503 |
| 1,885,866 | 11/1932 | Schiller | 60/503 |
| 2,872,778 | 2/1959 | Dane | 417/339 X |

*Primary Examiner*—Edgar W. Geoghegan
*Attorney, Agent, or Firm*—Clarence A. O'Brien; Harvey B. Jacobson

[57] ABSTRACT

Hydrostatic energy is converted to kinetic energy preferably for generating electricity by driving a fluid actuated motor connected to an electrical generator. Pumps are arranged in parallel for driving the motor, and are in turn actuated by engines driven themselves by a liquid contained in a reservoir in which the engines are disposed. The liquid in the reservoir is transferred to and from and also between the engines for actuating same.

13 Claims, 3 Drawing Figures

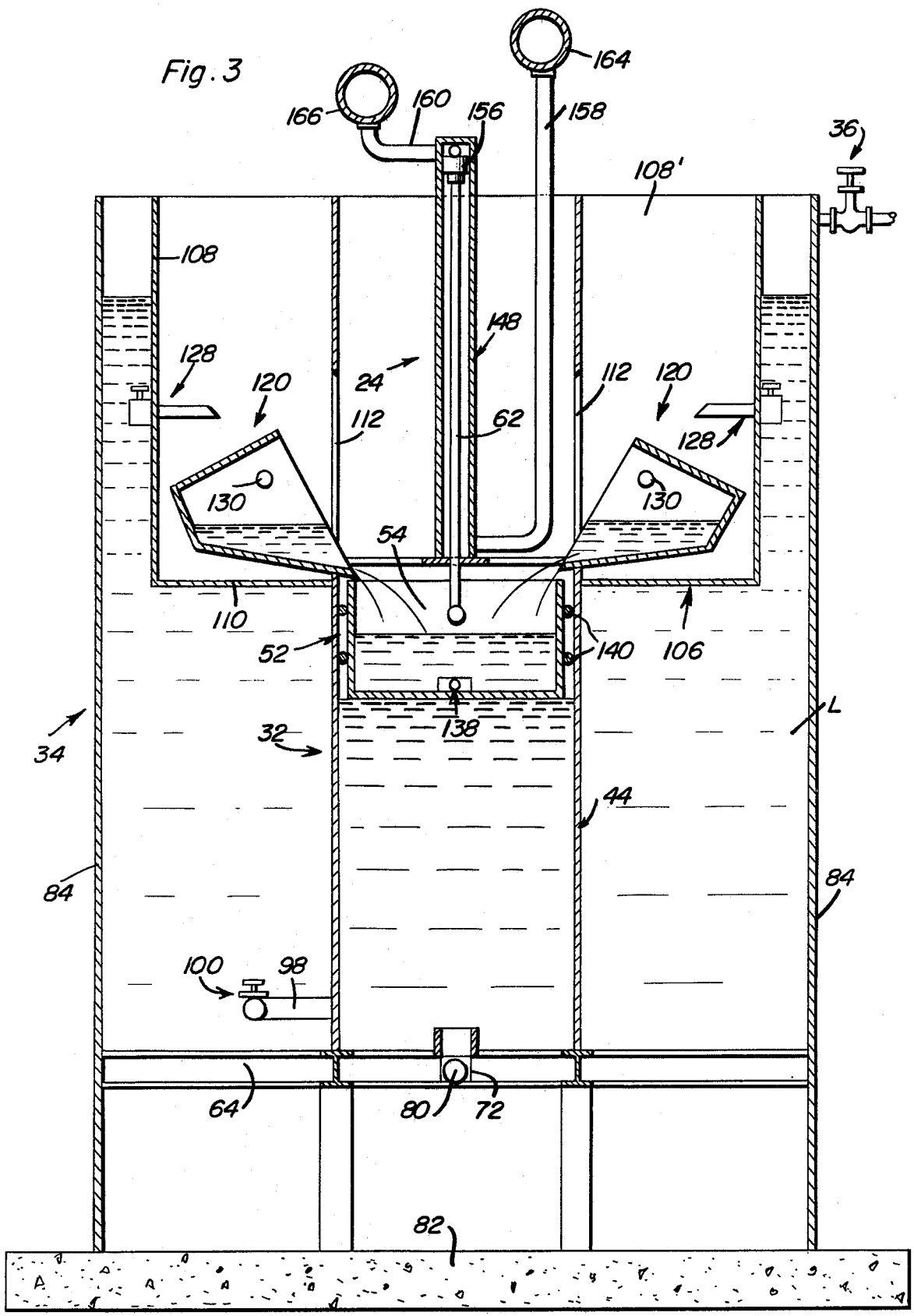

APPARATUS AND METHOD FOR CONVERTING HYDROSTATIC ENERGY TO ELECTRICAL ENERGY

BACKGROUND OF THE INVENTION

1. Field of the Invention

This invention relates generally to the field of energetics, and particularly to the formation of a reservoir of static energy by containment of kinetic energy in the form of water shed streams, and the like, and subsequent conversion of the static energy back into kinetic energy usable for efficiently developing power for mechanical and commercial purposes.

2. Description of the Prior Art

The power provided by nature in the form of falling water and the movements of oceans has long been sought to be efficiently harnessed so as to realize therefrom reliable and useful power production. For example, U.S. Pat. No. 1,209,975, issued Dec. 26, 1916, to J. A. Knowlton, discloses a tide motor wherein the rising tide first fills one of a plurality of cylinders and causes a float disposed in the cylinder to rise to an uppermost permissible height. At that time, another of the cylinders has its associated float disposed at a lowermost position within the cylinder. As the tide begins to fall, thus lowering the water level in the first of the cylinders, a valve leading to the outside water is opened in the second of the cylinders in order to raise the float disposed therein. When the water level is equalized in both of the cylinders, the valve leading to the outside water is now closed and a valve disposed between a higher reservoir and the second of the cylinders is opened, thus raising the float therein to its uppermost position while the ebb tide causes the float in the first of the cylinders to fall to its lowermost position. The cycle is thus repeated and by connection of the floats to piston rods, and the like, usable power is generated. Further, U.S. Pat. No. 1,885,866, issued Nov. 1, 1932, to A. T. Schiller, discloses a tidal motor which utilizes an attached piston-cylinder assembly that operates a pump attached to the assemblies. As floats of the motor rise and fall with the tide, the piston-cylinder assemblies compress to operate the pump.

Other examples of motors operated by the movement of a body or stream of water can be found in U.S. Pat. Nos: 693,270, issued Feb. 11, 1902, to R. H. Hannah; 975,157, issued Nov. 8, 1910, to G. Quedens, 1,451,580, issued Apr. 10, 1923, to M. T. Lindenberg; 1,557,290, issued Oct. 13, 1925, to S. Ippolito; 1,570,421, issued Jan. 19, 1926, to A. Abraham; and 3,487,228, issued Dec. 30, 1969, to B. Kriegel. In particular, U.S. Pat. No. 1,451,580 discloses a liquid motor which operates from a source of static liquid at suitable elevation which is appropriately circulated and controlled in a series of tanks, while U.S. Pat. No. 1,557,290 discloses a water engine intended for efficient operation utilizing low heads of water such as found in small brooks and shallow rivers.

SUMMARY OF THE INVENTION

It is an object of the present invention to provide for the generation of useful power through the use of a continuous water shed flow.

It is another object of the present invention to provide for energy generation using no other power input except for a continuous water shed flow.

It is yet another object of the present invention to provide a power generating device which utilizes water shed stream flow applied at the point of greatest efficiency in the apparatus.

It is a still further object of the present invention to provide for energy conversion in a simple and reliable manner by employing apparatus which is generally automatic in operation, positive acting and practical in operation, and which is comparatively inexpensive.

These and other objects are achieved according to the present invention by providing apparatus for converting hydrostatic energy, as provided by a low head stream flow, and the like, into kinetic energy, having: a fluid motor; a plurality of fluid pumps connected in parallel to the fluid motor for actuating same; a plurality of engines connected to the pumps for actuating same; and a fluid supply system associated with the engines for transferring operating fluid to and between the engines in order to actuate the engines and energize the apparatus.

Each of the fluid engines advantageously includes a container having a top and a bottom and in which is slidably disposed a float for vertical movement in the container between the top and bottom. The float is provided with a recess opening toward the top and the container, and is connected to an associated pump by means of a piston rod of the pump so as to actuate the pump on movement of the float within its associated container.

Preferably, the containers are of an even number and are grouped in pairs connected together by lines and valves partly forming the liquid supply system. The latter also includes a reservoir containing a liquid in which the containers of the engines are disposed, with a normally closed valve mounted on each of the containers adjacent a bottom thereof. These valves are opened at appropriate intervals to permit fluid to pass into the containers and force the floats disposed in the containers upwardly, as the level of liquid in the reservoir is maintained higher than the top of the stroke of the floats within the containers.

The liquid supply system further includes a dispensing arrangement in the form of a plurality of dump buckets arranged for feeding a predetermined quantity of liquid into the recesses provided in the floats. More specifically, the liquid is fed from the reservoir and into the dump buckets for discharge into associated floats whenever a particular float is at the top of its stroke in its respective container. Suitable valves are provided in the bottom of the floats so as to communicate with the recesses for discharging liquid from the recesses when the floats are at the bottom of their strokes in their respective containers. In this manner, it will be appreciated that water or other suitable liquid added to the recesses in the floats when the floats are at the top of their strokes in their respective containers will cause the floats to exert a downward force on the liquid in the containers and force the liquid out through open passages to an associated container in which no liquid is present and its associated float is disposed at the bottom of its stroke in the container. When the level of liquid is the same in both of the containers, the passage between the containers can be closed and liquid then fed into the container whose float is being pushed upwardly from the higher level of liquid in the reservoir in order to send the upwardly moving float to the top of its stroke in its associated container. In the meantime, liquid in the first of the containers can be completely drained therefrom in order to permit the associated float to move downwardly to the bottom of its stroke in its respective container. Continuous movement of the floats in the pair of containers can be realized by repeating the above steps.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged, schematic, sectional view taken generally along the line 3—3 of FIG. 1.

DESCRIPTION OF THE PREFERRED EMBODIMENTS

Figure 1:
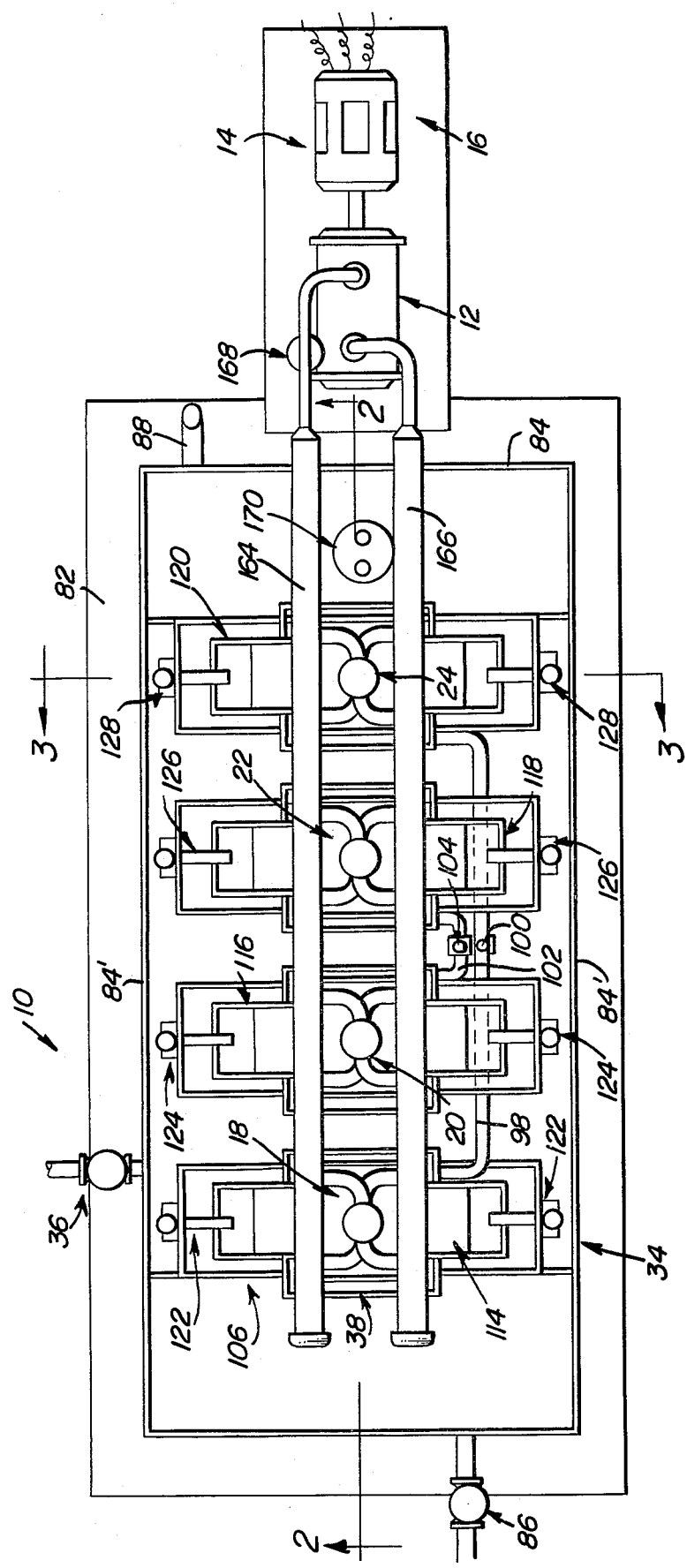
FIG. 1 is a schematic, top plan view showing apparatus according to the present invention for creating useful energy from static and nearly static sources of a suitable working fluid.

Referring now more particularly to the figures of the drawings, apparatus 10 according to the present invention converts static or nearly static energy to kinetic energy by means of a fluid motor 12 of conventional construction and operably coupled to a conventional electrical generator 14. The latter can be either an AC or DC generator, and is mounted on a suitable platform 16 together with motor 12. Apparatus 10 includes a plurality of pumps 18, 20, 22, and 24 connected in parallel to motor 12 for actuating same, and themselves actuated by a plurality of fluid engines 26, 28, 30 and 32. The latter are arranged in a tank 34 which forms a reservoir for water or other suitable liquid and partially forms a fluid supply arrangement which actuates engines 26, 28, 30, and 32. An intake line 36 is connected to a suitable source of operating fluid, such as a low head stream (not shown), for selectively feeding the operating liquid into tank 34 in order to maintain the level of such liquid in tank 34 at a predetermined height.

Each of the fluid engines 26, 28, 30, and 32 includes a respective container 38, 40, 42, and 44, each being vertically disposed and forming a top portion and a bottom portion, and each also having disposed therein vertically movable floats 46, 48, 50, and 52, respectively. Each of these floats is provided with a recess 54 opening toward the top portion of the associated one of the containers 38, 40, 42, and 44, with an associated one of the pumps 18, 20, 22, and 24, respectively, having a piston rod 56, 58, 60, and 62 connected to the associated float 46, 48, 50, and 52 for actuation of the pumps.

The containers 38, 40, 42, and 44 are supported on a deck 64 which is supported by and extends between downard extensions 38', 44' of parallel outer-most walls of the end containers 38, 44 in order to form a chamber beneath deck 64 which is separated from the reservoir of operating liquid L as contained in tank 34. Provided in deck 64 are ports 66, 68, 70, and 72 communicating with respective ones of the containers 38, 40, 42, and 44, and each having provided therein a suitable valve 74, 76, 78, and 80, respectively. Each of the latter mentioned valves, as well as all the other valves used in the operating liquid supply arrangement according to the invention are preferably remotely actuated valves, such as conventional electrically actuated solenoid valves.

Tank 34 includes a suitable base 82 which supports the partitions or extensions 38' and 44', and which also supports the walls 84, 84' of tank 34. Arranged near the bottom of one of the walls 84 is shown a drain line 86 which can be employed for draining tank 34 when necessary maintenance dictates such drainage. An overflow 88 is also provided in one of the walls 84 of tank 34 in order to assure that the level of liquid L in tank 34 does not exceed a predetermined height. It is also to be understood that the chamber formed by deck 64 and extensions 38', 44' drains directly to the exterior of tank 34.

As mentioned above, the containers 38, 40, 42, and 44 of the engines 26, 28, 30, and 32 are disposed in the reservoir L contained in tank 34. Normally closed valves 90, 92, 94, and 96 are mounted in apertures provided in the lower portions of each of the containers 38, 40, 42, and 44, with these valves 90, 92, 94, and 96 being selectively opened in a predetermined manner to permit liquid L to pass into the associated container and force the floats 46, 48, 50, and 52 disposed in the container upwardly. The level of liquid in reservoir L is kept higher than the portion of the containers 38, 40, 42, 44 which is arranged immediately beneath an associated pump 18, 20, 22, and 24, and which forms the upper end of an operating stroke of the associated float 46, 48, 50, and 52.

Preferably, there are an even number of engines, and containers for the engines, and the engines are connected in pairs as by the line 98 and associated valve 100, and by the line 102 and associated valve 104. In other words, the illustrated four engines 26, 28, 30, and 32 are connected into two pairs, with engines 26 and 32 being connected together by line 98 and valve 100, and engines 28 and 30 being connected together by line 102 and valve 104. The valves 100 and 104 are normally closed valves, as are the other valves of the apparatus.

Disposed in the upper portion of tank 34 are a plurality of housings 106 each associated with a respective container 38, 40, 42, and 44, and each formed by a side wall 108, 108' and a bottom wall 110. Provided in the upper extensions of the walls of the containers 38, 40, 42, and 44 are openings 112 which permit dump buckets 114, 116, 118, and 120 associated with each of the containers 38, 40, 42, and 44 to selectively dispense a predetermined quantity of the operating liquid into the recess 54 associated with a respective one of the floats 46, 48, 50, and 52.

Disposed immediately above each of the dump buckets 114, 116, 118, and 120 is a regulated flow nozzle 122, 124, 126, and 128 which is preferably of conventional construction so as to be opened from its normally closed mode as by an electrical signal transmitted in a suitable manner (not shown) in order to transfer a predetermined quantity of water from the reservoir L into the associated bucket. As can be seen from FIG. 3, each of the buckets 114, 116, 118, and 120 is mounted on an eccentric axis 130 such that the weight of water in the bucket will cause same to pivot about axis 130 and discharge the water into the recess 54 of an associated one of the floats 46, 48, 50, and 52. By proper sequencing of the opening and closing of the nozzles 122, 124, 126, and 128, the buckets can charge the floats in a desired sequence for proper operation of the engines 26, 28, 30, and 32.

Normally closed valves 132, 134, 136, and 138 are provided in the bottoms of floats 46, 48, 50, and 52, respectively, so as to communicate with the associated recess 54 and permit the liquid to be drained from recesses 54 as through the ports 66, 68, 70, and 72 provided in deck 64 for discharge from the containers associated with the floats. In this manner, the floats are relieved of the weight of the liquid in the floats prior to a float being moved upwardly from the bottom of its stroke to the top of its stroke.

Suitable bearings 140, and the like, are advantageously provided on the outer periphery of floats 46, 48, 50, and 52 so as to engage the inner wall surfaces of the associated containers 38, 40, 42, and 44 in order to reduce friction during movement of the floats within the containers.

Each of the pumps 18, 20, 22, and 24 includes a cylinder 142, 144, 146, and 148, respectively, each including a respective piston 150, 152, 154, and 156 disposed in fluid-tight slidable relationship within the associated cylinder. Also included in the pumps are the fluid circuits 158 and 160 each provided with appropriate check valves 162 and 162'. These circuits 158 and 160 are connected across pump discharge and intake manifolds 164 and 166 which are in turn operatively connected to the fluid motor 12. By this arrangement, it can be appreciated that a suitable working medium, such as oil, can be discharged from a particular one of the cylinders by the reciprocating movement of the associated piston 150, 152, 154, and 156, so as to pass out through the check valves 162 and into the discharge manifold 164 for passage through fluid motor 12 and back into the intake manifold 166. From the latter, the working fluid will pass through the check valves 162 and back into the cylinders of the pumps. Movement of a piston toward a particular check valve 162 will cause same to open, while movement away from the check valves 162' will open the latter.

A suitable valve 168 is inserted in the line connecting manifold 164 to the input side of motor 12 for regulating the flow of operating fluid reaching motor 12, and consequently for controlling the speed of motor 12. A conventional oil gauge reservoir 170 is advantageously connected on the intake manifold 166 for providing make-up working fluid to the pump system.

OPERATION

Figure 2:
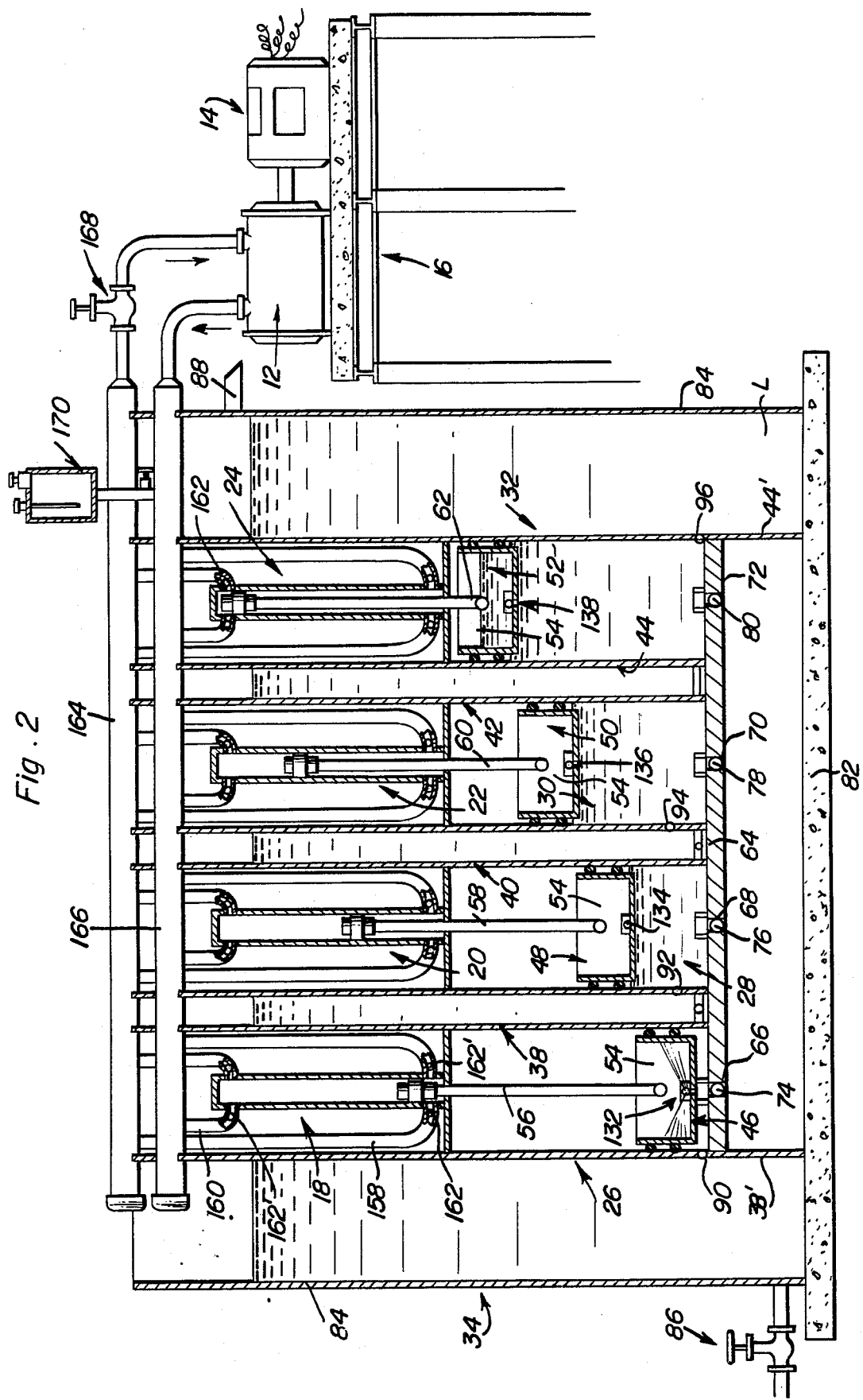
FIG. 2 is a schematic, sectional view taken generally along the line 2—2 of FIG. 1.

In operation, the tank 34 is filled with the operating liquid, which is preferably water, to the predetermined level within tank 34 in order to form reservoir L. When the floats are in the positions as seen in FIG. 2, the float 52 disposed at the upper end of its operating stroke is first weighted with the operating fluid by actuation of its associated flow nozzles 128, as shown in FIG. 3. The predetermined quantity of the operating liquid placed into the dump buckets 120 will subsequently be dispensed into the recess 54 of float 52, and valve 100 will be opened in order to provide a through passage through the line 98 and place the container 44 in communication with container 38. Float 52 will now move downwardly and float 46 upwardly until floats 46 and 52 are at substantially the same level within their respective containers. Now valve 100 can be closed once again, and the valves 80 and 90 opened in order to cause the remaining liquid within container 44 to be drained therefrom while liquid from reservoir L is fed into the container 38 in order to force the float 46 into the uppermost position shown for float 52 in FIG. 2. Whenever a float reaches the bottom of its operating stroke, as shown for float 46 in FIG. 2, the associated valve, such as valve 132, is opened in order to drain the liquid from recess 54 of the particular float and permit the liquid to be drained from the associated container by appropriate opening of the valve provided in deck 64. This is valve 66 disposed in port 74 for the float 46.

The above sequence is then repeated in reverse so as to achieve continual movement of the floats within their respective containers. Further, the sequence of operation is identical for engines 28 and 30 as it is for engines 26 and 32, although the floats of engines 26 and 30 are in different phases from the floats of engines 26 and 32 in order to provide a continuous series of pulses from the pumps 18, 20, 22, and 24 associated with the engines and provide a smoother pumping of the operating fluid through fluid motor 12.

SUMMARY

As can be readily understood from the above description and from the drawings, the present invention permits water which is substantially static in a reservoir fed from a low head source of the operating liquid to be efficiently and reliably converted into useful kinetic energy for generating electric power, and the like. By appropriate timing of the opening and closing of the various valves employed to direct the operating fluid as is appropriate for actuation of the engines forming the energy converting apparatus, virtually automatic operation is readily achievable. Further, maintenance is minimal. Although four engines connected in two pairs have been shown herein, it is to be understood that the number of engines employed may vary, although an even number of engines is desirable for smooth operation of the apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for converting static energy into useful kinetic energy comprising, in combination:
   (a) pump means connected to a motor for actuating same;
   (b) a plurality of fluid engines connected to the pumps for actuating same; and
   (c) supply means associated with the engines for transferring an operating fluid to and between the engines for driving the engines, each of the fluid engines including in combination:
      (1) a container having a top portion and a bottom portion and extending vertically therebetween; and
      (2) a float disposed in the container for vertical movement therein, with the float being provided with a recess opening toward the top portion of the container, with the pump means being connected to the float for actuation by movement of the float within the container.

2. Apparatus for converting static energy into useful kinetic energy comprising, in combination:
   (a) a plurality of fluid pumps connected in parallel to a fluid motor for actuating same;
   (b) a plurality of fluid engines connected to the pumps for actuating same; and
   (c) supply means associated with the engines for transferring an operating fluid to and between the engines for driving the engines, each of the fluid engines including in combination:
(1) a container having a top portion and a bottom portion and extending vertically therebetween; and
(2) a float disposed in the container for vertical movement therein, with the float being provided with a recess opening toward the top portion of the container, with an associated one of the pumps being connected to the float for actuation by movement of the float within the container.

3. Apparatus as defined in claim 2, wherein the containers are of an even number grouped in pairs connected together by lines and first valves partly forming the supply means.

4. Apparatus as defined in claim 2, wherein the supply means includes a reservoir containing a liquid in which the containers of the engines are disposed, and normally closed second valves mounted on the containers adjacent the bottom portions thereof, the second valves being open at selected intervals to permit fluid to pass into the containers and force the floats upwardly therein, the level of liquid in the reservoir being higher than an upper end of an operating stroke of the floats.

5. Apparatus as defined in claim 2, wherein the supply means includes dispensing means for feeding a predetermined quantity of liquid into the recesses provided in the floats when the floats are at the top of their operating strokes, and third valves provided in the floats for discharging liquid from the recesses when the floats are at a bottom end of their operating strokes within the containers.

6. Apparatus as defined in claim 5, wherein the dispensing means includes a plurality of dump buckets, one each of the dump buckets being associated with one of the containers for dumping liquid into the recesses provided in the floats disposed in the containers whenever the float is at the top end of its operating stroke.

7. Apparatus as defined in claim 5, wherein the containers are of an even number grouped in pairs connected together by lines and first valves partly forming the supply means.

8. Apparatus as defined in claim 5, wherein the supply means includes a reservoir containing a liquid in which the containers of the engines are disposed, and normally closed second valves mounted on the containers adjacent the bottom portions thereof, the second valves being open at selected intervals to permit fluid to pass into the containers and force the floats upwardly therein, the level of liquid in the reservoir being higher than an upper end of an operating stroke of the floats.

9. Apparatus as defined in claim 8, wherein the containers are of an even number grouped in pairs connected together by lines and first valves partly forming the supply means.

10. Apparatus as defined in claim 9, wherein the dispensing means includes a plurality of dump buckets, one each of the dump buckets being associated with one of the containers for dumping liquid into the recesses provided in the floats disposed in the containers whenever the float is at the top end of its operating stroke.

11. A method for converting static energy into kinetic energy, comprising the steps of:
(a) adding sufficient weight to a float in a first container substantially full of a liquid to cause the float to force the liquid from the first container;
(b) transferring the liquid from the first container to an initially empty second container until the level of the liquid in the two containers is about equal;
(c) feeding additional liquid into the second container until same is substantially full;
(d) emptying the first container; and
(e) repeating steps (a) through (d) so as to transfer the liquid from the initially full container to the initially empty container.

12. Apparatus as defined in claim 3, wherein the supply means includes a reservoir containing a liquid in which the containers of the engines are disposed, and normally closed second valves mounted on the containers adjacent the bottom portions thereof, the second valves being open at selected intervals to permit fluid to pass into the containers and force the floats upwardly therein, the level of liquid in the reservoir being higher than an upper end of an operating stroke of the floats.

13. Apparatus as defined in claim 3, wherein the supply means includes dispensing means for feeding a predetermined quantity of liquid into the recesses provided in the floats when the floats are at the top of their operating strokes, and third valves provided in the floats for discharging liquid from the recesses when the floats are at the bottom end of their operating strokes within the containers.

* * * * *